United States Patent [19]

Alitz

[11] Patent Number: 4,717,917

[45] Date of Patent: Jan. 5, 1988

[54] ALIEN RADAR SUPPRESSION CIRCUIT

[75] Inventor: Orville J. Alitz, Marion, Iowa

[73] Assignee: Rockwell International Corporation, El Segundo, Calif.

[21] Appl. No.: 749,147

[22] Filed: Jun. 26, 1985

[51] Int. Cl.$^4$ .............................................. G01S 13/22
[52] U.S. Cl. .................................................. 342/137
[58] Field of Search .............. 343/17.1 PF; 342/13 T, 342/342, 88, 131, 135, 136

[56] References Cited

U.S. PATENT DOCUMENTS

| | | | |
|---|---|---|---|
| 3,900,261 | 8/1975 | Wingate | 343/17.1 PF X |
| 4,049,953 | 9/1977 | Evans, Jr. | 343/17.1 PF X |
| 4,057,800 | 11/1977 | Ganz | 343/17.1 PF X |
| 4,106,019 | 8/1978 | Alexander et al. | 343/17.1 PF X |
| 4,219,817 | 8/1980 | Moore et al. | 343/17.1 PF |
| 4,593,286 | 6/1986 | Matthews et al. | 343/17.1 PF X |

FOREIGN PATENT DOCUMENTS 2412852  8/1979  France ........................ 343/17.1 PF Primary Examiner—Stephen C. Buczinski
Assistant Examiner—John B. Sotomayor
Attorney, Agent, or Firm—Robert C. Mayes; M. Lee Murrah; H. Fredrick Hamann

[57] ABSTRACT

Disclosed is an alien radio ranging transmitter rejection technique utilizing random PRF to eliminate the possibility of lock-on between two coherent R/T units in close proximity. If one, or both, are utilizing the random PRF technique taught herein, the alien signal is rejected utilizing standard noise suppression techniques. The random PRF is selected utilizing noise or angle data computed from the received return signal and is thereafter utilized to designate which one of a set number of PRF delays is utilized on a substantially random basis.

1 Claim, 3 Drawing Figures

ALIEN RADAR SUPPRESSION CIRCUIT

BACKGROUND OF THE INVENTION

This invention relates to radio ranging electronics equipment in general, and more particularly to pulsed Doppler radar systems.

Radars were developed to detect and determine the range of aircraft but in recent years their beams have become more directive, the receivers more sensitive, and transmitters have become more coherent. Radars have been successfully utilized in mapping storm structures showing the respective hydrometeors which can be correlated to map incipient storm activity. As these radars become more widely used, the improved coherency of the transmitters results in a severe alien radar noise problem which hithertofore has been successfully approached using noise suppression techniques.

Alien reception by a radar receiver tuned to the same frequency as another radar systems' transmitter is an often-encountered condition which is understood by all in the industry. Generally the solution to this type of interference has been one of tolerance as opposed to positive design measures, other than noise considerations and filtering, tailored to eliminate the problem. As transmit/receive frequencies have become more stable, and coherent systems more prevalent, the stability of the systems and the greater number of systems of the same type in service have combined to make the alien radar situation a severe problem. The frequency stability, same pulse repetition frequency, longer pulse widths, and memory supported displays, combined to assure reception of all similar type radars in the vicinity of the user with detrimental effects on the display. In the worse case situation, the display of the desired data becomes so contaminated with alien inputs as to become essentially useless.

The development of high coherency transmission capabilities has resulted in multiple stations having substantially identical equipments transmitting on very close, or the same, frequencies. Since the radar beams are highly directive, a significant amount of radio energy is concentrated in the receiver of a first radar when an alien radar is transmitting in the vicinity. This results in a broad smear indication on an uncorrected radar receiver screen and noise techniques are generally inadequate to eliminate such high energy multiple range bin alien signals. A comprehensive basis for the development and application of radar techniques is found in the text entitled, *Introduction to Radar Systems* by Merrill I. Skolnik, 2nd ed., 1980.

The application of various PRFs and pulse duration as a function of desired range and resolution information is well known in the art to obtain a higher PRF and narrower pulse width for high resolution on close targets and a lower PRF and wider pulse width on long-range targets assuming the target depths compatible with the pulse width selected. The PRF is a function of the time required for the signal to travel the path to the target and back. PRF decreases as range increases, as time must be allowed for the range return. Pulse width also may increase in range to obtain more range capability. Accordingly, those variable PRF systems are controlled as a strict function of the desired range indication, or possibly as a function of resolution desired. The alien radar problem can become severe in situations in which two radar equipments are substantially the same, as for example when manufactured by the same company and further are operating in relative close proximity.

SUMMARY

Accordingly, it is an object of the present invention to provide an alien radar suppression circuit having the capability of eliminating alien radar indications on a receiver display when such alien radar is transmitting on essentially the same frequency.

A yet further object of the present invention is to provide a circuit capable of rejecting alien radar transmissions and returns in a highly reliable fashion without interfering with range data obtained from bona fide targets.

Briefly, and in accordance with the present invention, a pulsed radio ranging apparatus comprises means for operation at a substantially random pulse repetition rate. This random pulse repetition rate significantly reduces the potential for alien radar interference.

A pulsed Doppler radar apparatus in accordance with the present invention, comprises means for generating a series of substantially random signals, within a specified range of values; and pulse repetition rate control circuitry coupled thereto, and operable to vary the pulse repetition rate as a function of the substantially random signals. The net effect is to eliminate the possibility of two essentially similar radars in the same vicinity locking on each other since one or both will have a random PRF, the other will be unable to interfere with the acquired range information.

A pulsed Doppler radar, in one embodiment of the present invention, comprises a pulsed repetition rate control apparatus having a substantially random number generation means for providing a first variable control input, counter means responsive to the number generation means first control input, coupled thereto and for outputting variable timing intervals as a function of the substantially random number generation means variable control input; and a pulse repetition rate control circuitry coupled to the counter means, including transmit and receive synchronization circuitry, and having a substantially random pulse repetition rate control characteristic as a function of the variable timing intervals. In one embodiment, the pulse repetition frequency has a variability of sixteen periods which are selected at random, and in combination with standard noise suppression circuitry, substantially eliminates the possibility of an alien radar input locking on since the PRFs will vary, and therefore unrepeated range bin data, using standard digital filter techniques, will be typically discarded. This occurs in spite of the high energy of the alien radar input.

BRIEF DESCRIPTION OF THE DRAWINGS

A more comprehensive understanding of the present invention will become readily apparent upon reading the following specification in conjunction with the drawings in which.

DETAILED DESCRIPTION

The solution to the problem as approached herein necessarily involves both transmitter and receiver. The transmitter varies the PRF in a random manner on a pulse-to-pulse basis. This distributes the alien radar returns as seen by the receiver in a random manner, much like noise, so techniques used to control receiver noise can effectively operate against the alien radar "noise" returns.

It should be noted that "random" and "substantially random", as used herein, as not exclusive of a pseudo-random configuration having a programmed series of variable pulsed intervals; however, the less random a pseudo-random system is due to its program, the more likely an alien radar having the same pseudo-random system will be to lock on to the user equipment. Accordingly, the more random the PRF becomes due to design as suggested herein, the better the likelihood that alien radars of a like kind will be effectively rejected. Furthermore, while the description of the embodiment contained herein is limited to radar applications, any radio ranging apparatus may apply this technique to good effect with similar alien radio transmitter rejection results.

Figure 1:
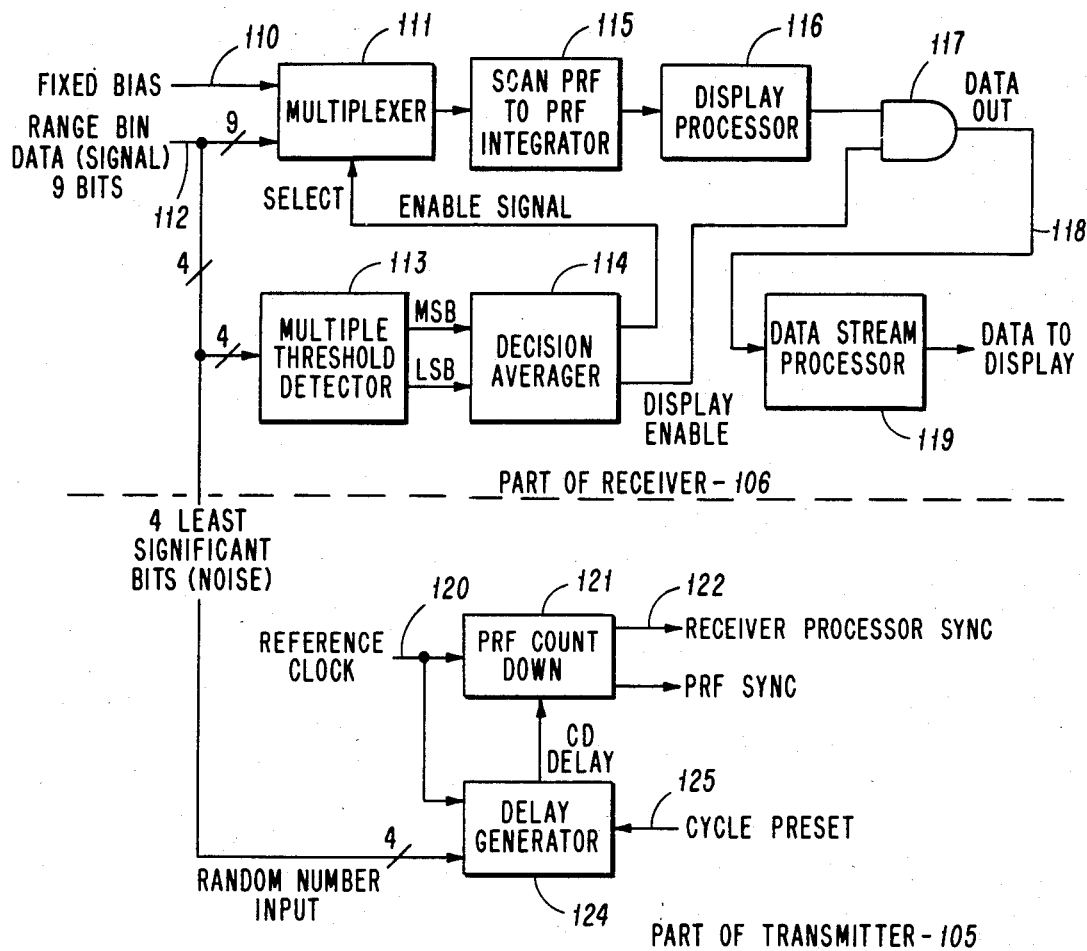
FIG. 1 is a block diagram of a portion of a radar transmitter and receiver containing the inventive circuit wherein an alien radar output suppression technique in accordance with the present invention is successfully applied.

Referring now to FIG. 1, there is shown a block diagram showing general interrelationships of the portion of the transmitter 105 utilizing the presently-invented circuitry and its relationship to that part of the receiver 106 to apply, in this embodiment, range bin data on the nine-bit input line 112 to the multiple threshold detector 113 utilizing the four least significant bits of noise. This provides an extremely randon number input in a digital format to delay generator 124 which generates a count-down delay control signal thereafter input into the pulse repetition frequency count-down timer 121 which controls both receiver processor synchronization 122 and the pulse repetition frequency synchronization on line 123. The delay generator 124 has additional inputs of reference clock 120 (also provided to the PRF count-down timer 121), and a cycle preset 125 for overall control of the signal in accordance with a desired PRF frequency such as high, medium or low, to compensate for range selection or resolution desired as previously discussed. Within the receiver the range bin data signal on the nine line bus 112, is input into multiple threshold detector 113 and multiplexer 111 which also has a fixed bias input 110 and a select enable signal from the decision averager 114. Multiple threshold detector 113 categorizes the nine line input 112 into one of four levels specified by the two-bit (MSB, LSB) output which are relayed to a decision averager 114 to control the enable signal select for multiplexer 111 and the display enable signal to the AND gate 117. The data-out signal 118 from the AND-gate 117 provides control to the data stream processor 119 and thereafter to the display itself.

It can be seen that the range bin data input to the multiplexer will control the randon number input to the delay generator of the transmitter, and that it will be extremely random since the least significant bits will be highly random in their characteristics. Accordingly the count-down delay signal to the PRF count-down control block 121 will have a random variability, resulting in a random pulse repetition frequency.

It should be noted that the range bit data utilized in a preferred embodiment to obtain the random number input may be easily supplanted by alternative random number generator means as are known in the art or by coupling an alternative random number input to the delay generator such as a pseudo-random program device as previously discussed. A pseudo-random program will greatly enhance the benefit obtained therefrom in the present invention if the quantity of the pseudo-random pattern is sufficiently broad to provide a very low chance of lock-on with a similar device. For the foregoing reasons, a range bit data signal having a true random aspect is utilized in a preferred embodiment, as is a suitable length pseudorandom number in an alternative preferred embodiment.

The decision averager 114 receives an input code of a value which categorizes the level of the multiple threshold detector 113 input from the range bin data signal on bus 112. This code is assigned a weighting inversely related to the amplitude range which the code represents. This weighting is selected such that the maximum charge of the decision averager is approximately independent of the amplitude of the signal encoded by the threshold detector 113. This makes the decision averager charge and discharge characteristic approximately independent of target amplitude. The display turn on/-off in AND gate 117, then becomes consistent for all targets irrespective of amplitude, resulting in reduced target smear in azimuth due to the scan integrator, plus target position consistency when changing the direction from which the antenna scan approached the target. For all targets, the display data stream is enabled and the range bin inputs to the scan integrator 115 are enabled when the combination of weighted signal plus noise above threshold is greater than 45%, in this embodiment.

Conversely, whenever the average drops below 45%, the display is inhibited and the scan integrator input is switched from the range bin data input to the fixed bias input. The fixed bias input 110 provides a consistent resting value at the nominal noise level for the scan integrator input whenever it is not enabled for range bin data integration from bus 112. Controlling the scan filter resting value results in a more consistent and predictable response to the range bin data.

The range bin data is integrated on a pulse-to-pulse basis by the scan integrator 115 and input to the display processor 116 which ultimately encodes the data for each of the 256 range bins, and in this exemplary embodiment, into a three-bit wide code for the display system. The data out is routed to the data stream processor 119 on line 118. As is known in the art, the data stream processor is sequentially clocked for the 256 range bins using the last three range bins clocked to determine the next data for the display. The result is that single noise and alien radar hits are discarded while single range bins below threshold are restored by data compatible with the data of adjacent range bins. Use of the last output (old) data in a typical digital logic configuration, results in hysteresis having the following characteristics. When the data stream toggles above and below threshold on alternate range bins if the "old" data output at the start of the toggling period was "zero", the output will remain "zero" during the toggling period. Conversely, if the "old" data output at the start of the toggling period was "one", the output will remain "one" during the toggling period. The apparent result in the display is to enhance distributed targets such as weather, and suppress point targets (such as ground). In addition, an approximately two dB improvement in usable receiver threshold is realized. As discussed, the next data output is provided on the basis of Table I as follows:

TABLE I

| New | Previous | Old | Next |
|-----|----------|-----|------|
| 0 | 0 | 0 | 0 |
| 0 | 0 | 1 | 0 |
| 0 | 1 | 0 | 0 |
| 0 | 1 | 1 | 1 |
| 1 | 0 | 0 | 0 |
| 1 | 0 | 1 | 1 |
| 1 | 1 | 0 | 1 |
| 1 | 1 | 1 | 1 | wherein "zero" is below threshold, and a "one" is above threshold.

The use of additional range filtering, as taught herein, subsequent to azimuth filtering of received data is particularly advantageous in the present exemplary embodiment of the invention due to the clearer display, and affirmative removal of "singleton" alien radar noise hits. This data control is more than a mere squelch mechanism and can enhance the display at any display level, including color variations. This two-out-of-three range filter technique with the "toggling" suppression or hysteresis characteristic is particularly useful in one preferred embodiment and was implemented utilziing a 512×4 programmable memory bipolar PROM and a 54LS174 flip-flop.

As the decision on the data output is made at the range bin interval, a parameter of importance is the relation between the range bin interval and the transmitted pulse width. In this case the transmitted pulse width always exceeds the range bin interval, the ration of range bins per transmitted pulse width increasing with decreasing selected range (note each selectable range has 256 range bins equally distributed in that range). As the selected range is decreased, the transmitted pulse width is also decreased but at a lesser rate such that the ratio continually increases with decreasing selected range.

At the higher ratios the transmitted pulse width traverses many range bins, so only noise hits are removed. At the longer ranges, the ratio approaches unity so that not only are the noise hits removed, but also the point targets (usually ground clutter) while those targets which occupy two or more range bins are retained. These targets which are distributed in range are more characteristic of weather targets.

Figure 2:
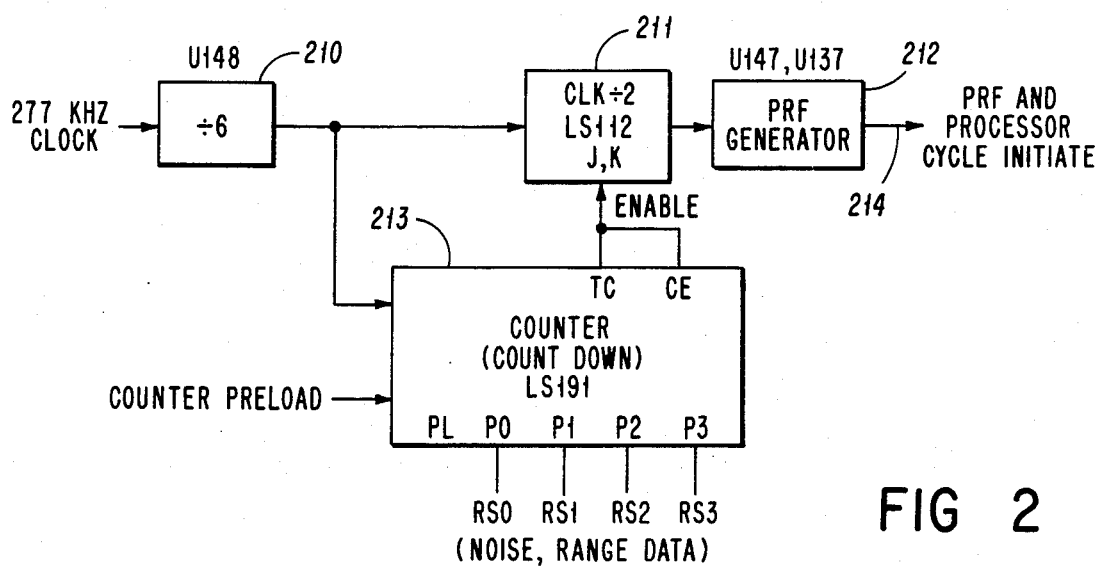
FIG. 2 is a block diagram of the pulse repetition rate frequency control generation circuitry in accordance with the present invention having a substantially random noise input, and therefrom developing a pulse repetition frequency (PRF) control signal).

The transmitter PRF is made random as indicated in FIGS. 1 and 2. In this exemplary embodiment, the 277 kHz clock shown in FIG. 2, is sequentially divide by the divider 210 to produce a selection of one of four different pulse repetition frequencies. To introduce the randomness into the PRF, the sequential dividing change is interrupted for an interval determined by the delay generator or count-down counter 213, for a preset number of counts. This enable signal is input into the divide-by-two flip-flop 211 to provide the clock input to the PRF generator 212 enabling the PRF and processor cycle initiation on line 214. The counter has a counter preload input as well as the noise range data in this embodiment, and the value of the counter preload is determined randomly by sampling of range bin data bits which are below the receiver noise threshold. Significantly, the counter preload should be substantially random to avoid synchronization between two or more similar equipments. Additionally, even with a pseudorandom PRF variability, a synchronization possibility exists which would be detrimental to the effectiveness of the alien rejection technique as taught herein.

The system shown herein provides for a random selection of one of sixteen different pulse repetition frequencies with a minimum separation of 21.6 microseconds. The minimum separation was selected to assure that the PRF would change at least the maximum expected transmit pulse width, thus avoiding overlapping synchronization of the signal as viewed by another system's receiver.

Figure 3:
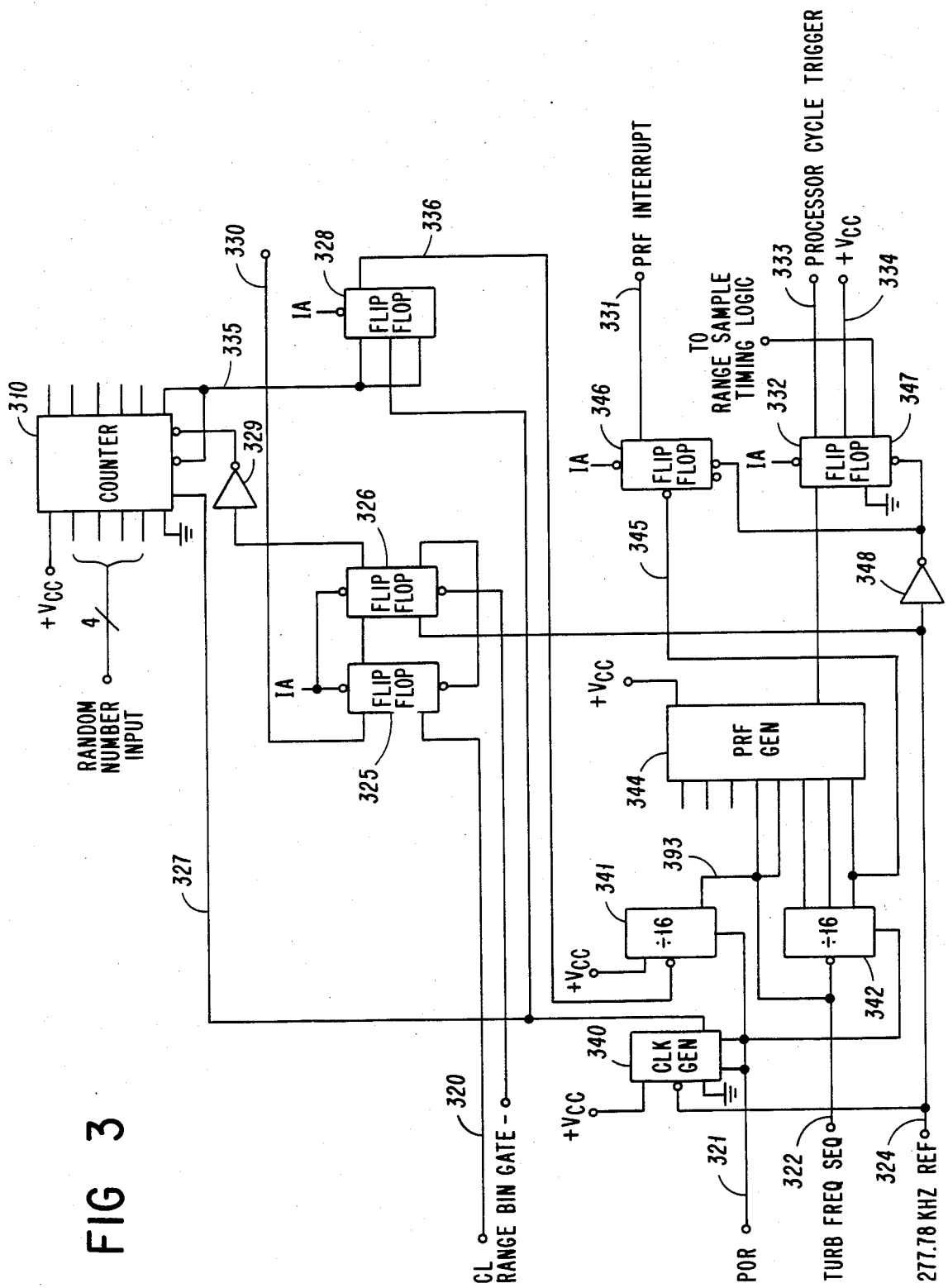
FIG. 3 is a detailed circuit diagram showing the actual hardware and interconnections to the logic and control circuitry in one embodiment.

Referring now to FIG. 3, an actual circuit diagram showing the respective components in their proper relative positions is shown having the random number input to counter 310 which is the four least significant bits of filtered range data in one embodiment, and in an alternative preferred embodiment, the least significant four bits of the digital representation of the received signal phase angle which will be less random than filtered noise, however it will be generally acceptable in alternative applications dependent upon ease of implementation to obtain the level of random number generation desired in a given application. The counter 310 utilized was a 54LS191 asynchronous four bit binary up/down counter which was coupled through the inverter 329 to receive the output of flip-flops 325, 326 which are utilized to initiate range bin gate and control cycle initiation on line 330. Flip-flops 325, 326 were implemented utilizing 54LS75 dual-D type flip-flops. Flip-flop 328, 346 and 347 were implemented utilizing 54LS112, dual-JK edge triggered flip-flops. The PRF generator 344 utilized was a 54LS253 dual four-to-one three-state multiplexer coupling the divide-by-sixteen asynchronous counters receiving input 322, as well as input 321, and the 277 kHz reference clock signal 324. The clock generator 340 provides the counter input to counter 310 and the clock generator 340 is implemented utilizing a 54LS92, a divide-by-twelve asynchronous counter.

In actual operation, and subsequent to a counter load signal on line 320, the counter 310 receives a random number input and outputs a timed signal received by flip-flop 328 resetting the clock generator and proceeding to a divide-by-sixteen by the asynchronous counters 341, 342 providing inputs to the PRF generator 344 which multiplexes an output to flip-flop 347 which controls the range sample timing logic (not shown) on line 332 and the processor cycle trigger on line 333, thereby controlling the PRF initiation. Thus it can be seen that the divide-by-sixteen function provides for a random initiate PRF time from one to sixteen units for every pulse repetition cycle. This initiation time is tracked through coupling to the receiver side such that appropriate timing considerations may be factored into the range sample timing logic on line 332 and thereby obtain appropriate range bin data, as is known in the art, to generate an appropriate display.

The exemplary embodiment described and taught herein is one implementation which is useful for suppression of alien radar signals, however the invention is not limited to radars nor to the specific implementation shown herein, but may be readily applied to any radio ranging apparatus having an alien transmitter reception problem.

We claim:
1. A pulsed Doppler radar apparatus comprising:
   a. circuitry for generating a series of substantially random signals, within a one-to-sixteen range of values;
   b. pulsed repetition rate control circuitry coupled thereto, and operable to vary said pulse repetition rate within said specified one-to-sixteen range as a function of said substantially random signals; and
   c. tracking circuitry for factoring appropriate timing considerations including a two-out-of-three range filter data processor having a hysteresis characteristic.

* * * * *

UNITED STATES PATENT AND TRADEMARK OFFICE
CERTIFICATE OF CORRECTION

PATENT NO. : 4,717,917
DATED : January 5, 1988
INVENTOR(S) : Orville J. Alitz et al.

It is certified that error appears in the above-identified patent and that said Letters Patent is hereby corrected as shown below:

On the Title Page, Item [75] should read:
-- Orville J. Alitz and Daniel L. Woodell, both of Marion, Iowa --.

Signed and Sealed this

Third Day of May, 1988

Attest:

DONALD J. QUIGG

Attesting Officer

Commissioner of Patents and Trademarks